United States Patent [19]
Seigler

[11] Patent Number: 6,102,760
[45] Date of Patent: Aug. 15, 2000

[54] WATER SPORTS AIRFOIL

[76] Inventor: Robert S. Seigler, 106 Highland Dr., Greenville, S.C. 29605-1855

[21] Appl. No.: 09/209,850

[22] Filed: Dec. 10, 1998

[51] Int. Cl.$^7$ ........................................................ B63B 1/00
[52] U.S. Cl. .............................. 441/65; 114/253; 441/68
[58] Field of Search .................................. 441/65, 68, 74, 441/79; 114/271, 272, 253, 254, 315

[56] References Cited

U.S. PATENT DOCUMENTS

| | | | |
|---|---|---|---|
| 2,709,266 | 5/1955 | Munn | 114/315 |
| 2,815,518 | 12/1957 | Kuehn . | |
| 2,930,338 | 3/1960 | Flomenhoft . | |
| 3,092,858 | 6/1963 | Wallach . | |
| 3,105,249 | 10/1963 | Palmore . | |
| 3,320,625 | 5/1967 | Schlueter . | |
| 3,358,304 | 12/1967 | Esmay . | |
| 3,604,031 | 9/1971 | Cahill . | |
| 3,802,010 | 4/1974 | Smith | 441/74 |
| 4,738,414 | 4/1988 | McCulloh | 114/253 |
| 4,898,345 | 2/1990 | Clayton | 114/272 |
| 5,357,894 | 10/1994 | Jacobson | 114/272 |

FOREIGN PATENT DOCUMENTS

| | | |
|---|---|---|
| 592466 | 5/1959 | Italy . |
| 618588 | 3/1961 | Italy . |

*Primary Examiner*—Stephen Avila
*Attorney, Agent, or Firm*—Leatherwood Walker Todd & Mann, P.C.

[57] ABSTRACT

A water sports device adapted for carrying a rider airborne completely above the surface of the water upon being towed by a tow device. The water sports device comprises an elongated airfoil having a top portion and a bottom portion substantially opposite the top portion, the top portion being adapted for supporting the rider thereon. At least one tow connector is attached to the elongated airfoil, and the elongated airfoil is of a shape which causes it to receive an upward lift reaction from an airstream moving relative thereto upon being towed by the tow device. An elongated spar is provided within the airfoil to which the tow connector is attached. The interior support of the airfoil is, in one embodiment, polystyrene, such as Styrofoam® and the exterior surface is fiberglass. Alternate embodiments include the provision of pontoons under the elongated airfoil, and the attaching of at least one operable aileron, rudder, and/or at least one downwardly extending fin to the elongated airfoil.

25 Claims, 3 Drawing Sheets

WATER SPORTS AIRFOIL

BACKGROUND OF THE INVENTION

This invention relates generally to a water sports device having an airfoil on which the user rides as he or she is towed by a tow device such as a boat.

Water sports devices such as water skis, para-sails, kneeboards, jet skis, etc., enjoy continued popularity with water sports enthusiasts. Devices such as motorboats and jet skis carry their own propulsion means, while products such as water skis, knee boards, para-sails, etc., rely on a boat or some other towing device during use. These towed devices are typically of relatively simple design and allow the skier or rider to enjoy freedom in moving about the water while being towed. In the instance of a para-sail, the rider is actually pulled at a speed sufficient to give the para-sail enough lift to raise the rider out of the water.

While the para-sail allows the rider to leave the water and become airborne, maneuverability of the para-sail, once airborne, may not be as rapid or extensive as desired. Further, the para-sail is inherently somewhat cumbersome in its handling and use, due to the size and characteristics of the sail itself and its accompanying lines, ropes, and/or cords.

Accordingly, it will be desirable to have a relatively simple device which would allow the rider to become airborne and to enjoy a more rapid response to maneuvering inputs by the rider.

Water sports devices have been patented on which a rider is carried and which is towed by a towing device such as a motorboat. For example, U.S. Pat. No. 3,105,249, issued to Palmore, discloses a hydrofoil apparatus for being drawn through the surface of the water and which includes a seat and handlebars for the rider. U.S. Pat. No. 2,815,518, issued to Kuehn, discloses a water vehicle having hydrofoils and a portion for supporting a rider, together with a steering system.

U.S. Pat. No. 3,320,625, issued to Schlueter, discloses a winged surfboard having a wing and stabilizers.

Italian Patent Document Nos. 592,466 and 618,588 disclose hydro-wing devices having winged portions which are pulled through the water. U.S. Pat. No. 3,604,031, issued to Cahail discloses a hydrofoil board having a seat portion connected to inclined foils which glide through the water.

SUMMARY OF THE INVENTION

It is, therefore, the principal object of this invention to provide a water sports device capable of being towed by a tow device and carrying a rider.

Another object of the present invention is to provide a water sports device for carrying a rider above the surface of the water.

Yet another object of the present invention is to provide a water sports device capable of being steered in the water by the rider.

Still another object of the present invention is to provide a water sports device having flight control surfaces capable of controlling flight of the device above the surface of the water.

A further object of the present invention is to provide a water sports device on which the rider can stand, kneel, sit or lie prone during use.

A still further object of the present invention is to provide a method of causing a rider of a water sports device to become airborne.

Generally, the present invention includes a water sports device adapted for carrying a rider and for being towed by a tow device. The water sports device comprises an elongated wing, or airfoil, having a top portion and a bottom portion substantially opposite the top portion, the top portion being adapted for supporting the rider thereon. At least one tow connector is attached to the elongated airfoil, and the elongated airfoil is of a shape which causes it to receive an upward lift reaction from an air stream moving relative thereto upon being towed by the tow device.

More specifically, the present invention also includes an elongated spar within the airfoil to which the tow connector is attached. The interior support of the airfoil is, in one embodiment, polystyrene, such as Styrofoam® and the exterior surface is fiberglass.

Additionally, other embodiments of the present invention include the provision of at least one pontoon under the elongated airfoil, and attaching at least one operable aileron, rudder, and/or at least one downwardly extending fin to the elongated airfoil.

The airfoil of the present invention also includes a portion on which the rider may sit, kneel, or stand, as well as at least one handle for the rider to hold onto during use. Once the rider is onboard the airfoil, and the airfoil connected to a tow device such as a motorboat, tow cable from a wench, land-based vehicle, etc., and towing is begun, the airfoil will experience lift forces. Because the airfoil is of a cross-sectional aerodynamic profile, aerodynamic forces cause a lift force to be applied to the bottom of the wing, causing it to become airborne upon an appropriate tow speed being achieved. The user can influence when "takeoff" of the airfoil occurs, by shifting his or her body weight to increase the angle of attack of the airfoil. Likewise, the user may, by shifting his or her body weight, lessen the angle of attack to cause the airfoil to dive or, perhaps, stay in the water and not become airborne at all.

Once airborne, the user, again, by shifting his or her body weight, can cause the airfoil to bank from side to side, turn, climb, dive, and perhaps, even roll.

In one embodiment, at least one operable aileron is provided which can be actuated by the user to further enhance flight control of the airfoil. Additional flight control surfaces, such as flaps, elevators, etc., could also be provided, as well as a V-shaped wing profile instead of the longitudinally, relatively straight, profile illustrated herein.

Furthermore, the airfoil of the present invention could include at least one downwardly extending stabilizer fin for enhancing control of the airfoil while both in the water and in flight, and additionally, at least one rudder could be provided which could be operated by the rider to enhance control of the airfoil while it is both waterborne and airborne. Moreover, at least one transversely mounted pontoon could be provided on the airfoil which would cause the airfoil to sit up higher, or perhaps completely out of, the surface of the water in order to enhance airflow beneath the wing, and, accordingly, lift of the airfoil while being towed by the tow device.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
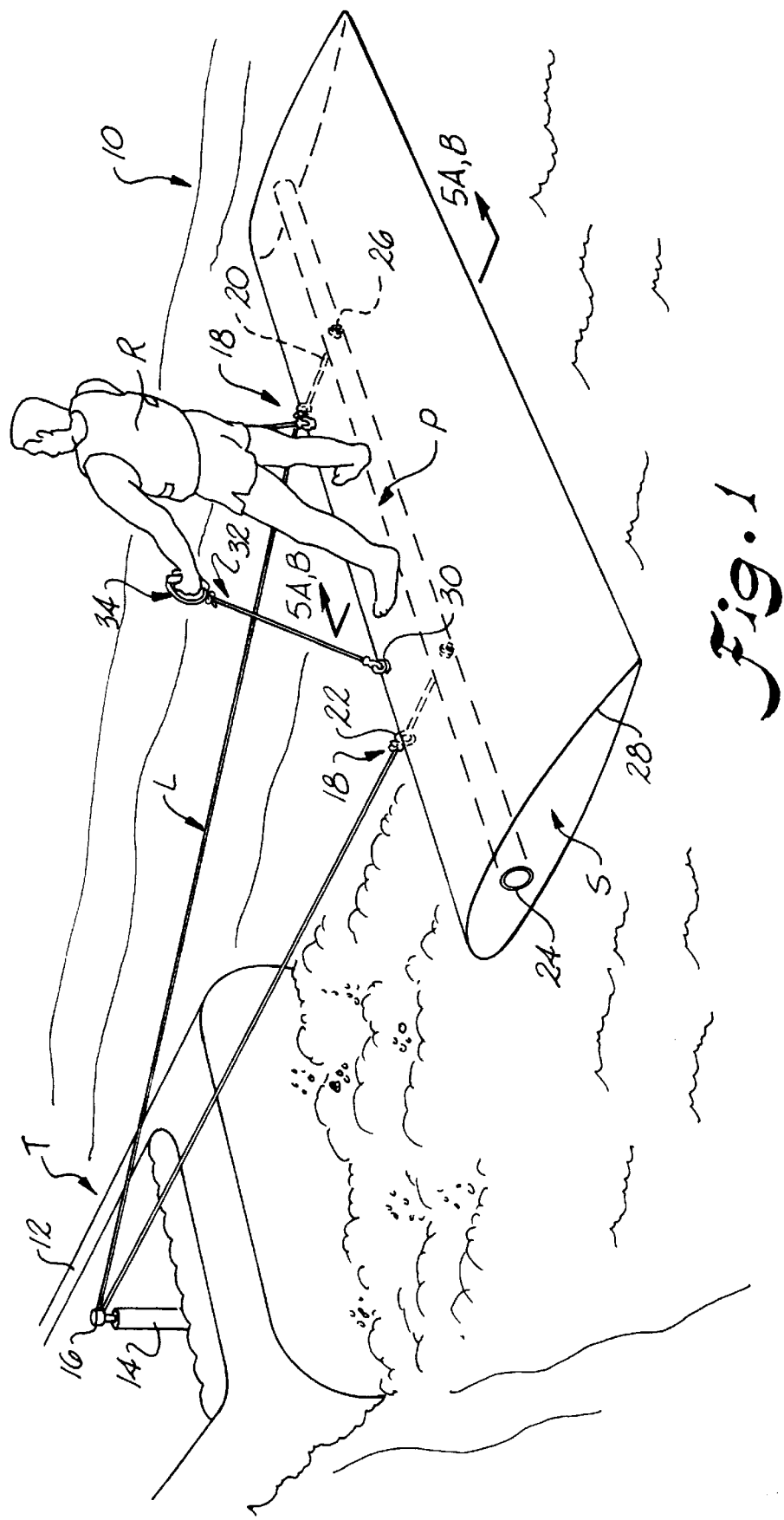
FIG. 1 is a perspective view of a water sports device constructed in accordance with the present invention illustrating a rider standing thereon while the device is being towed by a boat.

The accompanying drawings and the description which follows set forth this invention in its preferred embodiment. However, it is contemplated that persons generally familiar with water sports devices and airfoils will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the water sports device of the present invention is indicated generally in the figures by reference character 10.

Turning to FIG. 1, airfoil 10 is illustrated having a rider R standing thereon. Airfoil 10 is connected to a tow device, generally T, by tow ropes, or lines, generally L. Tow device T is illustrated as being a motorboat 12 having an upwardly extending tow bar 14, having a tow ring, generally 16 connected thereto. In the FIG. 1 illustration, airfoil 10 is being towed by towboat 12 at a speed sufficient for it to become airborne above the height of the surface of the water, generally W.

In the embodiment of the present invention shown in FIG. 1, tow connectors, generally 18, are provided on airfoil 10, and can include eyebolts 20 having ringed portions 22 to which tow lines L are connected.

Extending substantially the length of airfoil 10 is an elongated spar 24. In one preferred embodiment, spar 24 is a polyvinyl chloride (PVC) pipe to which threaded ends of eyebolts 20 are received, with bolts 26 retaining eyebolts to spar 24.

Encircling spar 24 is the airfoil support structure, generally S. Support structure S, in the preferred embodiment, is polystyrene, commonly known as Styrofoam®. Support structure S forms the basic aerodynamic profile of airfoil 10 and is preferably covered along its surfaces with a fiberglass skin 28. However, other materials, such as fabric, neoprene, plastic and/or rubber or vinyl coatings could also be used if desired. Further, support structure S, if constructed of a rigid material such as polystyrene, could be used without any skin 28 at all, if desired.

It is to be noted that support structure S, although preferably constructed of a buoyant material such as polystyrene, could also be air, if airfoil 10 was made of airtight construction, such as blow molded plastic. Further, airfoil 10 could be constructed of vinyl, plastic, rubber, or some other material such that it could be inflated for use, and then deflated for transport and/or storage.

Connected to airfoil 10 are attachment rings 30 to which handle ropes, generally 32, are attached. Handle ropes 32 are also provided with handles, generally 34, which are grasped by the rider R during use. Although handles 34 have been shown as being connected to airfoil 10 by ropes 32, it is to be understood that handles 34 could be of a variety of configurations, and could be flexibly or rigidly attached to airfoil 10 by other means such as by plastic piping, plastic coated cables, etc.

Airfoil 10 defines a platform, generally P, on which rider R is shown standing in FIG. 1. Rider R could also sit, kneel, or even lie down on platform P during use, if desired.

Figure 2:
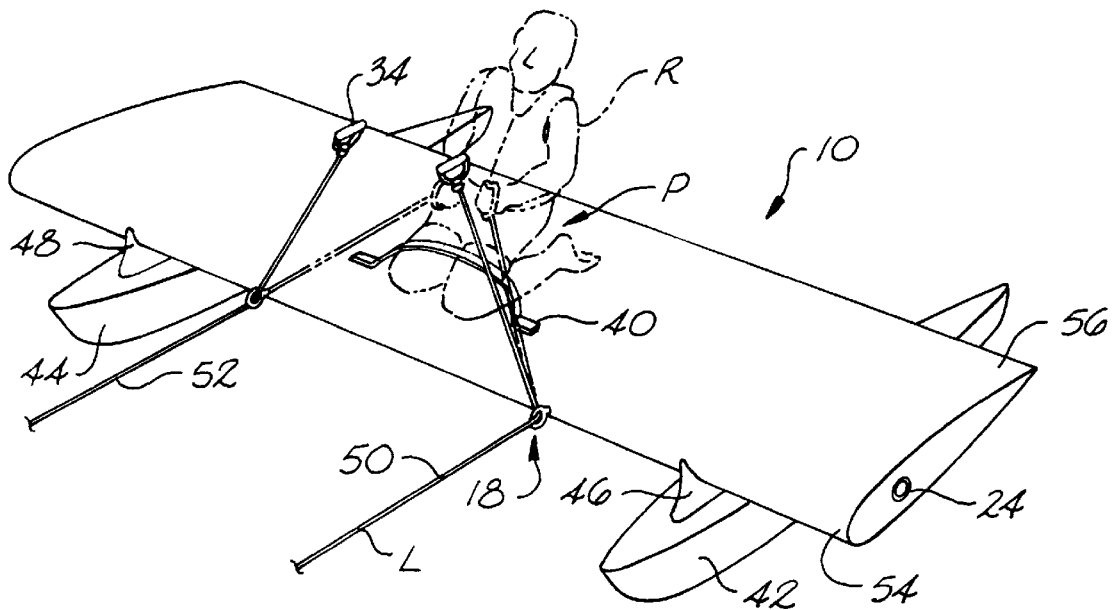
FIG. 2 is a perspective view of an alternate embodiment of a water sports device constructed in accordance with the present invention having pontoons thereon and on which a rider in kneeling as he rides.

An alternate embodiment of the present invention is illustrated in FIG. 2. In the FIG. 2 embodiment, lines L are not fixedly tied to tow connectors 18, but are instead allowed to freely pass therethrough. Rider R, through grasping of handles 34, and through his or her attachment to platform P of airfoil 10 by a releasable strap 40, effectively connects airfoil 10 to the tow device. Strap 40 could include a hook and fastener system, such as Velcro®, or could use snaps, buckles, clips or the like in order to fasten airfoil 10 to Rider R.

Also provided on airfoil 10 is at least one pontoon, two pontoons, 42, 44 being illustrated in the FIG. 2 embodiment. Pontoons 42, 44 are connected to the underside of airfoil 10 by pylons 46, 48, respectively. Pontoons 42, 44 pylons 46, 48 could be material such as polystyrene, fiberglass, rigid plastic, aluminum, etc. or some other suitable material.

Pontoons 42, 44 can be used to raise airfoil 10 such that airfoil 10 is only partially, or entirely spaced above the surface of the water W. This allows a greater airflow beneath airfoil 10, once airfoil 10 is towed. By allowing a greater airflow under airfoil 10, airfoil 10 should experience lifting forces at lower tow speeds than perhaps would be expected without pylons 42, 44. Pylons 42, 44 could be configured such that they stayed with airfoil 10 during flight, or pylons 42, 44 could be configured such that they can be jettisoned from airfoil 10, when airfoil 10 becomes airborne, or when otherwise desired.

In the FIG. 2 embodiment, rider R will actually experience the towing force from the towing device T, since lines L are not secured to tow connectors 18, but are instead held by the rider R. However, rider R will also be able to manipulate lines 52 independently of one another, if desired, to in effect turn air foil 10, or otherwise maneuver it during flight. Rider R could also extend his arms forward, while leaning back and holding lines 50, 52, and perhaps increase the angle of attack of airfoil 10 by raising the leading edge 54 thereof with respect to trailing edge 56. Rider R could also do the reverse, in order to lower leading edge 54 of airfoil 10 if he desired to cause airfoil 10 to enter a dive.

Figure 3:
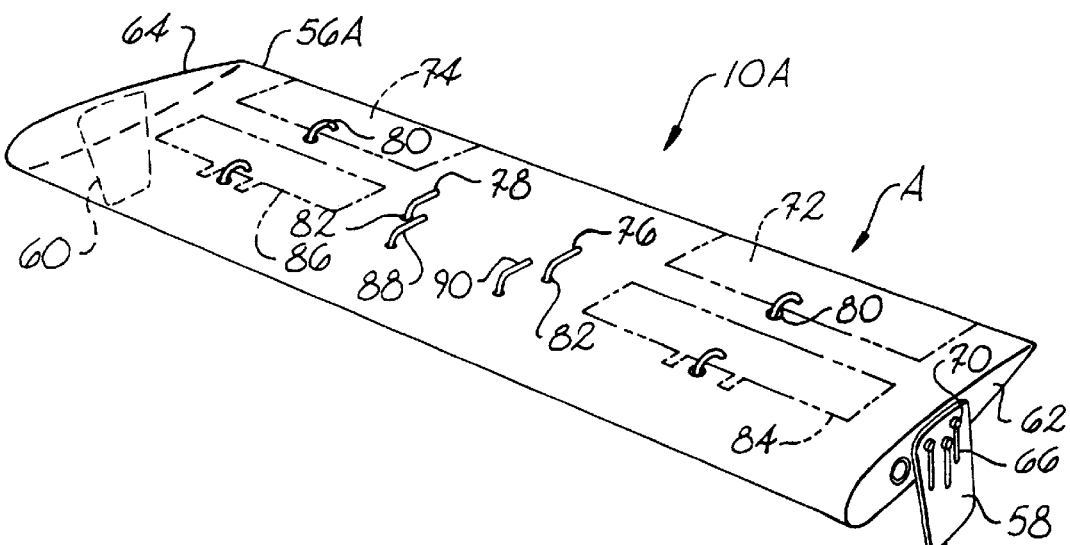
FIG. 3 is a perspective view of another alternate embodiment of a water sports device constructed in accordance with the present invention having ailerons and downwardly extending stabilizer fins.

FIG. 3 illustrates a further embodiment of the airfoil of the present invention, and is designated generally as 10A. Airfoil 10A includes at least one downwardly extending stabilizer fin, generally F, and in FIG. 3, two stabilizer fins 58, 60 are shown, each of fins 58, 60 extending downwardly from a respective end 62, 64 of airfoil 10A. Elongated slots 66 are provided within each fin F to allow for adjustment of the length by which the end 68 of a fin 58, 60 extends below airfoil 10A. Enlarged head pins or screws 70 are provided in the ends 62, 64 of airfoil 10A for receipt in slots 66 of fins 58, 60 and allow for the fixing of a fin in the desired position after adjustment.

Airfoil 10A also includes at least one operable aileron, generally A. In the FIG. 3 embodiment, ailerons 72, 74 are illustrated adjacent trailing edge 56A of airfoil 10A. Ailerons 72, 74 can be connected by ropes or cords 76, 78, which pass downwardly through holes 80 through airfoil 10A, and then upwardly through holes 82 and extend outwardly therefrom. During use, rider R could pull up on cords 76, 78 simultaneously, or independently of one another, to operate ailerons 72, 74. Further, spoilers 84, 86 are provided on forward portions of airfoil 10A and are similarly operable by cords 88, 90 to further enhance the maneuverability of airfoil 10A during use.

Figure 4:
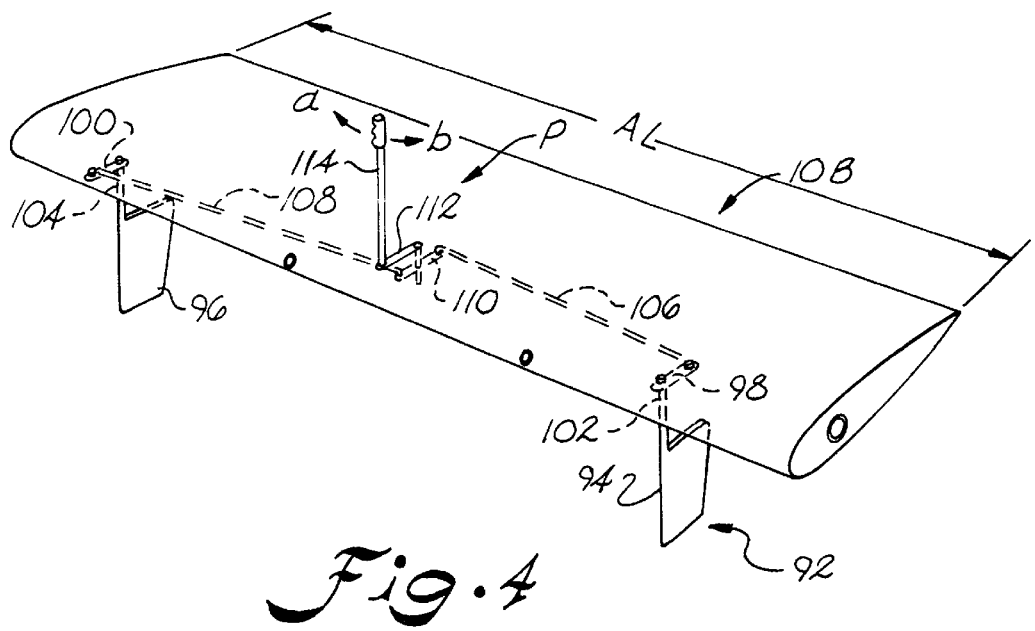
FIG. 4 is perspective view of a further alternate embodiment of a water sports device constructed in accordance with the present invention having movable rudders through which the rider may steer the device while riding thereon.

Turning to FIG. 4, a further embodiment of the present invention is shown. This embodiment, illustrated generally by reference numeral 10B, includes at least one rudder generally 92 to allow for steerage of airfoil 10B while in the water and in flight. In FIG. 4, airfoil 10B is shown having two rudders, 94, 96. The rudder system in FIG. 4 is shown in simplified form, and includes idler arms 98, 100 being fixedly connected to the respective upper ends 102, 104 of rudders 94, 96, respectively. Tie rods 106, 108 are connected to idler arms 98, 100, respectively, such that movement of tie rods 106, 108 causes respective movement of idler arms 98, 100, and in turn, rudders 94, 96, respectively. An arm, such as a pitman arm 110, is connected to both tie rods 106, 108, and a crank arm 112 is connected to pitman arm 110, with an upstanding handle 114 connected to pitman arm 112. Handle 114 is moveable in the direction shown by arrows a and b in order to cause corresponding pivoting of rudders 94, 96. Thus, the rider can cause airfoil 10B to be steered to the left and to the right while being towed in the water, and also while airborne.

Figure 5A:
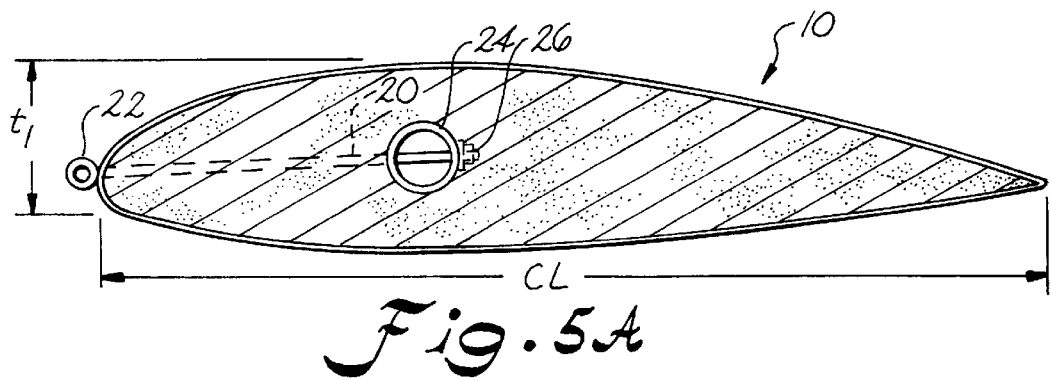
FIG. 5A is a sectional view taken along lines 5A—5A of FIG. 1.
Figure 5B:
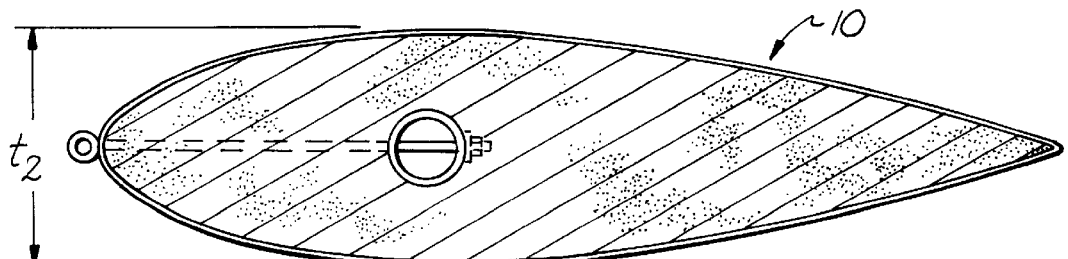
FIG. 5B is a sectional view taken along lines 5B—5B of FIG. 1.

FIGS. 5A and B are sectional views of variations of airfoil 10, the difference between the views being the thickness of airfoil 10. The thickness $t_1$ of the airfoil in FIG. 5A being less than the thickness $t_2$ of the airfoil profile illustrated in FIG. 5B. It should be noted that the profile of the airfoil of the present invention could be any number of a varieties of known aerodynamic profiles. For example, the chord length CL of the airfoils of the present invention could be between 3 and 4 feet and the length of the airfoils AL (FIG. 4) is preferably between 8 and 12 feet, although both the dimensions of the CL and the AL could be greater than or less than these lengths, depending on the application desired, the desired aerodynamic effects, costs, age and/or weight of the rider, the level of skill of the rider, etc.

In one preferred embodiment, the maximum airfoil thickness is between 6% and 18% of the length of CL at a distance of between 20% to 40% of the length of CL aft of leading edge 54. Further, in general and to a limit, the more blunt leading edge 54 is, and the thickness of the airfoil, the greater lift, but also, correspondingly, the greater the drag. Conversely, a thinner profile would typically yield less drag, but also, accordingly, less lift.

From the foregoing, it can be seen that the present invention includes a water sports airfoil capable of a variety of configurations and variations. The airfoil could be of very simple, basic construction, such as shown in FIG. 1, or could be much more elaborate and could include in a single embodiment, the pontoons, rudders, ailerons, spoilers, and fins, if desired, or, the present airfoil could have any combination of those features, if desired.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A water sports device adapted for use on and about the surface of the water, the water sports device being for carrying a rider and for being towed by a tow device through an airstream moving relative thereto, the water sports device comprising:
    an elongated airfoil having a top portion and a bottom portion substantially opposite said top portion, said top portion defining a platform for completely supporting the rider thereon;
    at least one tow connector attached to said elongated airfoil; and
    said elongated airfoil having an aerodynamic shape causing it to receive an upward lift reaction from the airstream moving relative thereto upon being towed by the tow device and to leave entirely the surface of the water.

2. The water sports device as defined in claim 1, wherein said elongated airfoil includes a longitudinally extending spar.

3. The water sports device as defined in claim 1, wherein said elongated airfoil includes an external covering and internal support structure supporting said external covering.

4. The water sports device as defined in claim 3, wherein said external covering is fiberglass.

5. The water sports device as defined in claim 3, wherein said internal support structure is polystyrene plastic.

6. The water sports device as defined in claim 1, further including a handle connected to said elongated airfoil for grasping by the rider.

7. The water sports device as defined in claim 1, further comprising an attachment strap connected to said elongated airfoil for fixing the rider to said elongated airfoil.

8. The water sports device as defined in claim 1, wherein said elongated airfoil has a chord length and said chord length is between three and four feet.

9. The water sports device as defined in claim 1, wherein the length of said elongated airfoil is between eight and twelve feet.

10. The water sports device as defined in claim 1, wherein the maximum thickness of said elongated airfoil is between eight and twelve inches.

11. The water sports device as defined in claim 1, wherein said elongated airfoil includes a cross-sectional profile having a chord length, a longitudinally extending leading edge and a longitudinally extending trailing edge opposite said leading edge; and said maximum thickness of said cross-sectional profile being between six and eighteen percent of said chord length at a distance of twenty to forty percent of said chord length aft of said leading edge.

12. The water sports device as defined in claim 1, further comprising at least one pontoon connected to said bottom of said elongated airfoil.

13. The water sports device as defined in claim 1, further comprising at least one aileron connected to said elongated airfoil and an aileron control connected to said aileron for controlling the movement thereof.

14. The water sports device as defined in claim 1, further comprising at least one downwardly extending fin connected to said elongated airfoil.

15. The water sports device as defined in claim 14, wherein said fin is configured to be selectively movable with respect to said elongated airfoil.

16. The water sports device as defined in claim 1, further comprising at least one rudder connected to said elongated airfoil and a rudder control linkage connected to said rudder for controlling the movement thereof.

17. The water sports device as defined in claim 2, wherein said spar is an elongated pipe.

18. The water sports device as defined in claim 1, further comprising at least one spoiler connected to said elongated airfoil and a spoiler control connected to said spoiler for controlling the movement thereof.

19. A water sports device adapted for use on and about the surface of the water, the water sports device being for carrying a rider and for being towed by a tow device through an airstream moving relative thereto, the water sports device comprising:

an elongated airfoil having a polystyrene support structure defining a top portion and a bottom portion substantially opposite said top portion, said top portion defining a platform for completely supporting the rider thereon, and said elongated airfoil including a longitudinally extending spar extending through said support structure;

a handle connected to said elongated airfoil for grasping by the rider, said handle being connectable to the tow device; and said elongated airfoil having an aerodynamic shape causing it to receive an upward lift reaction from the airstream moving relative thereto upon being towed by the tow device and to leave entirely the surface of the water.

20. A method of providing an airborne platform in an airstream for a rider above a surface of a body of water, the method comprising:

providing a tow device;

providing an elongated airfoil having a top portion and a bottom portion substantially opposite said top portion, said top portion defining a platform for completely supporting the rider thereon;

connecting said tow device to said elongated airfoil; and towing said elongated airfoil with said tow device a speed sufficient for causing said elongated airfoil to receive an upward lift reaction from the airstream such that said elongated airfoil leaves the surface of the water entirely.

21. A water sports device adapted for use on and about the surface of the water, the water sports device being for carrying a rider and for being towed by a tow device through an airstream moving relative thereto, the water sports device comprising:

an elongated airfoil having a top portion and a bottom portion substantially opposite said top portion, said top portion defining a platform for supporting the rider thereon;

at least one tow connector attached to said elongated airfoil;

said elongated airfoil having an aerodynamic shape causing it to receive an upward lift reaction from the airstream moving relative thereto upon being towed by the tow device and to leave entirely the surface of the water; and at least one pontoon connected to said bottom of said elongated airfoil.

22. A water sports device adapted for use on and about the surface of the water, the water sports device being for carrying a rider and for being towed by a tow device through an airstream moving relative thereto, the water sports device comprising:

an elongated airfoil having a top portion and a bottom portion substantially opposite said top portion, said top portion defining a platform for supporting the rider thereon;

at least one tow connector attached to said elongated airfoil;

said elongated airfoil having an aerodynamic shape causing it to receive an upward lift reaction from the airstream moving relative thereto upon being towed by the tow device and to leave entirely the surface of the water; and at least one aileron connected to said elongated airfoil and an aileron control connected to said aileron for controlling the movement thereof.

23. A water sports device adapted for use on and about the surface of the water, the water sports device being for carrying a rider and for being towed by a tow device through an airstream moving relative thereto, the water sports device comprising:

an elongated airfoil having a top portion and a bottom portion substantially opposite said top portion, said top portion defining a platform for supporting the rider thereon;

at least one tow connector attached to said elongated airfoil;

said elongated airfoil having an aerodynamic shape causing it to receive an upward lift reaction from the airstream moving relative thereto upon being towed by the tow device and to leave entirely the surface of the water; and at least one downwardly extending fin connected to said elongated airfoil, said fin being selectively moveable with respect to said elongated airfoil.

24. A water sports device adapted for use on and about the surface of the water, the water sports device being for carrying a rider and for being towed by a tow device through an airstream moving relative thereto, the water sports device comprising:

an elongated airfoil having a top portion and a bottom portion substantially opposite said top portion, said top portion defining a platform for supporting the rider thereon;

at least one tow connector attached to said elongated airfoil;

said elongated airfoil having an aerodynamic shape causing it to receive an upward lift reaction from the airstream moving relative thereto upon being towed by the tow device and to leave entirely the surface of the water; and at least one rudder connected to said elongated airfoil and a rudder control linkage connected to said rudder for controlling the movement thereof.

25. A water sports device adapted for use on and about the surface of the water, the water sports device being for carrying a rider and for being towed by a tow device through an airstream moving relative thereto, the water sports device comprising:

an elongated airfoil having a top portion and a bottom portion substantially opposite said top portion, said top portion defining a platform for supporting the rider thereon;

at least one tow connector attached to said elongated airfoil;

said elongated airfoil having an aerodynamic shape causing it to receive an upward lift reaction from the airstream moving relative thereto upon being towed by the tow device and to leave entirely the surface of the water; and at least one spoiler connected to said elongated airfoil and a spoiler control connected to said spoiler for controlling the movement thereof.

* * * * *